United States Patent [19]
Ueberall

[11] Patent Number: 4,599,019
[45] Date of Patent: Jul. 8, 1986

[54] OVERLOAD COUPLING DEVICE

[75] Inventor: Paul Ueberall, Neuhausen, Fed. Rep. of Germany

[73] Assignee: Otto Bilz, Werkzeugfabrik, Ostfildern, Fed. Rep. of Germany

[21] Appl. No.: 664,885

[22] Filed: Oct. 25, 1984

[30] Foreign Application Priority Data

Dec. 20, 1983 [DE] Fed. Rep. of Germany ....... 3345948

[51] Int. Cl.$^4$ ............................................. B23Q 5/22
[52] U.S. Cl. ................................... 408/139; 192/56 R
[58] Field of Search ...................... 409/232; 192/56 R; 408/139, 141; 464/35; 10/141 H, 135 R

[56] References Cited

U.S. PATENT DOCUMENTS

| | | | |
|---|---|---|---|
| 1,681,288 | 8/1928 | Galloway | 408/139 |
| 3,787,136 | 1/1974 | Steiner | 10/141 H R |
| 4,041,729 | 8/1977 | Bilz | 192/56 R |
| 4,284,374 | 8/1981 | Senzaki | 192/56 R X |

FOREIGN PATENT DOCUMENTS

| | | | |
|---|---|---|---|
| 2511148 | 9/1976 | Fed. Rep. of Germany | 192/56 R |
| 383516 | 11/1932 | United Kingdom | 192/56 R |

Primary Examiner—William R. Briggs
Attorney, Agent, or Firm—Michael J. Striker

[57] ABSTRACT

An overload coupling device includes a drive shank, a drive sleeve for driving the drive shank, a closure sleeve surrounding the drive sleeve, and a thrust ring. The drive sleeve is formed with a plurality of cage slots arranged in pairs to provide a first group of the cage slots of one width, which receive coupling balls of one group operative to transmit torque in the working drive direction, and a second group of the cage slots of a greater width which receive movable therein coupling balls of another group operative to transmit torque in the direction opposite to the working drive direction. The coupling device further includes an elastic element positioned in an annular groove between the closure sleeve and the drive sleeve and exerting on the respective coupling ball a prestressed radial force.

15 Claims, 8 Drawing Figures

OVERLOAD COUPLING DEVICE

BACKGROUND OF THE INVENTION

The present invention relates to an overload coupling device for thread-cutter chucks or quick-change inserts therefor.

An overload coupling device of the type under consideration comprises a cylindrical drive sleeve loadable with a rotational drive moment, a drive shank driven by the drive sleeve and held coaxially and rotatably with that sleeve, a mounting receiving a tap drill, and a torque coupling positioned in the force flux between the drive sleeve and the drive shank.

The overload coupling device of this type is disclosed in German patent DE-PS No. 25 11 148 corresponding to U.S. Pat. No. 4,041,729. In the disclosed coupling device the drive sleeve has three cage slots spaced from each other at equal intervals in the circumferential direction, a coupling ball being supported immediately in each of said cage slots with a sufficient motion play. The width of each cage slots corresponds, taking into consideration the motion play, to the diameter of the coupling ball. The wall of each cage slot, which upon the release of the ball-pocket coupling, lifts the coupling balls out from the respective ball pockets, is formed such that during the uncoupling the coupling balls remain in this uncoupled position and do not tend thereby, during the repeated passing the ball pockets, to fall back into these pockets under a short-time clutching-in of the coupling. The overload coupling device operates precisely and durably separates the quick-change insert from the drive upon the occurrence of the torque release. The construction of the plane-retaining axial surfaces of the spring-biased thrust ring acting on the coupling balls is particularly suitable; other specific advantages of the known overload coupling device are described in detail in the aforementioned patent.

It has been, however, shown that the specific shape of the respective walls of the cage slots, which lift or push the coupling balls away from their pockets, upon the release of the coupling, involved quite high manufacturing expenses and require high precision because these walls or surfaces are each divided into two individual surfaces, from which one individual surface is formed as the radially inwardly extending surface adjacent the peripheral surface of the drive shaft, particularly the contact portion, which in the coupled condition of the coupling abuts somewhat tangentially on the periphery of the coupling ball. The 15 other individual surface extends at an angle relative to that contact portion and thereby parallel to the opposite wall of the cage slot. Both surface portions together run in the corner region which lies substantially on the circumference which is greater than the outer circumference of the drive shaft and on which the coupling balls lie in the coupled condition. Such wall of the cage slot, which is subdivided into two individual surfaces inclined to each other, is difficult and expensive to manufacture. In the corner region the wall of the cage slot, where two surface portions strike against each other, terminates with a blade-shaped line. Upon the transition of the coupling balls from the coupled position into the uncoupled position, the coupling balls must pass this blade-shaped line, whereby forces will exert on the coupling balls in this region during the circumferential movement. This causes increased wear of the walls of the cage slots and of the coupling balls as well.

SUMMARY OF THE INVENTION

It is an object of the present invention to provide an improved overload coupling device for thread-cutter chucks or quick-change inserts for the chucks.

It is another object of this invention to provide an overload coupling device which is inexpensive in manufacture and can be produced with very small axial and radial dimensions.

It is still another object of this invention to provide a coupling device which is resistant to wear and is durable and precise in operation.

Yet another object of the invention is to provide a coupling device which reliably releases the tap drill from the drive without, however imparting blows or strokes to the drive or to the workpiece in which a thread has been cut by the tap drill.

These and other objects of the invention are attained by an overload coupling device for thread-cutter chucks or quick-change inserts therefor, comprising a cylindrical sleeve loadable with the rotational drive moment, a drive shank drivable by said drive sleeve and held coaxially and rotatably within said sleeve; a spring-loaded ball-socket coupling with adjustable tripping torque seated in a force transmission flux between said drive sleeve and said drive shank and including a plurality of coupling balls which couple said drive shank with said drive sleeve, said drive sleeve being formed with a plurality of cage slots which are inwardly and outwardly open in a radial direction and which are open in an axial direction on axial end faces thereof, said cage slots each receiving one of said coupling balls, the angular width of said cage slots being at least as great as the diameter of each coupling ball, said drive shank having a peripheral surface facing said drive sleeve and being formed at said peripheral surface in the axial regions of said cage slots with recessed ball-sockets spaced from each other at equal angular intervals in a circumferential direction, said ball-pockets being of a depth smaller than the diameter of the coupling ball and adapted to receive said coupling balls; a cylindrical closure sleeve coaxially surrounding said drive sleeve and held on said drive sleeve with a formation therebetween of an annular space; a thrust ring arranged in said annular space on an axial side of said coupling balls, said thrust ring being adjustably supported by thrust springs axially in the direction towards said cage slots and being pressable against said coupling balls, said cage slots being substantially inclined towards a working drive direction of said drive sleeve, said closure sleeve having in the axial region of said cage slots in an interior an annular groove, the bottom of which extends at a radial distance corresponding at least to the diameter of said coupling ball from said peripheral surface of the drive-shank, said cage slots being arranged in the circumferential direction of said drive sleeve in pairs and following closely adjacent one after another, one of the cage slots in a pair having an angular width which is substantially as great as the diameter of the associated coupling ball, and another cage slot in the pair, which follows closely adjacent said one cage slot, having an angular width which is substantially greater than the diameter of the associated coupling ball; and an annular elastic element arranged in the annular space between the closure sleeve and the drive shank, said elastic element, in response of said ball-pocket coupling exerting on the respective coupling ball, radially displaced from the associated ball pocket into said annular groove and positioned between said peripheral surface of said drive shaft and said annular groove of said closure sleeve, a prestressed radial force.

In operation of said ball-pocket coupling one of two coupling balls positioned in each pair of the cage slots may be always under radial and axial prestressing.

In operation of the ball-pocket coupling and upon rotation of said drive sleeve each of the two coupling balls positioned in each pair of the cage slot may be under radial and axial prestressing in alternation with another coupling ball in each pair while another coupling ball may be unloaded and freely movable.

The elastic element may be enclosed in said closure sleeve and be able to exert an inwardly directed radial force.

The elastic element may be arranged in the region axially and radially adjacent to an axial base of said cage slots.

The closure sleeve may have in the region of said annular groove and at an axial and radial level of said cage slots a circular groove in which said elastic element is received and held such that the elastic element in an unloaded condition of said coupling projects radially inwardly beyond a base of said annular groove.

The elastic element may be radially prestressed between said annular groove and an outer peripheral surface of said drive sleeve.

The elastic element may be a ring of elastic material, for example natural or synthetic rubber.

Each cage slot may have two opposite walls, the opposite walls of one cage slot in each pair diverging from each other in the radial direction to form at least slightly a V-shape, a rear one of said two walls, as seen in the working drive direction in operation of said coupling, acting on the associated coupling ball in the direction of lifting said ball out from the associated ball pocket and extending approximately along a secant to a diametrical plane of said drive sleeve while another wall of said one cage slot extends approximately along the diametrical plane of said drive sleeve.

The opposite walls of another cage slot in each pair may diverge outwardly from each other in the radial dirction to form at least slightly a V-shape, one of the opposite walls of said another cage slot acting in operation of said coupling on the associated coupling ball in the direction of lifting said ball away from the associated ball pocket extending along a diametrical plane of said drive sleeve while another wall of said another cage slot extends approximately along a parallel secant to the diametrical plane of said drive sleeve.

The wall of said one cage slot extending along the diametrical plane and the wall of said another cage slot extending along the diametrical plane may extend substantially along one and the same plane and being both formed by a thin material web extending in the direction of said plane.

Three of said one cage slots may be provided in said drive sleeve and spaced from each other at equal angular intervals and receive the coupling balls of a first group to transmit a drive moment in the working drive direction, and three of said another cage slots may be provided in said drive sleeve which are also spaced front each other at equal angular intervals and receive the coupling balls of another group, said coupling balls of another group being movable in the assocaited another cage slots between two opposite walls thereof in the circumferential direction, said coupling balls of another group non-participating in the transmission of the drive moment in the working drive direction but rather transmitting a drive moment in the direction opposite to said working drive direction when another wall of said another cage slot, extending approximately along a parallel secant to the diametrical plane of said drive sleeve, engages the assocaited coupling ball.

The advantageous construction of the coupling of this invention includes three cage slots of the first group with respective coupling balls and three cage slots of the second group with the coupling balls inserted therein. Thereby, the coupling balls positioned in the cage slots of the second group and supported over a greater peripheral extension actually effect the coupling only then when, after the uncoupling in the rotation in the drive direction a renew coupling in the counter direction must be obtained. In this counter direction the coupling balls of the second group act in the cage slots of the second group as return-torque-transmitting elements. The moment in the working drive direction in the coupled condition is invariably transmitted by the coupling balls of the first group in the cage slots of the first group. The opposite walls of these cage slots of the first group extend in the outward direction generally smoothly. These cage slots are easy to manufacture. Furthermore, rapid possible wear of the walls of the slots and/or coupling balls is substantially minimized by the proposed construction. It is also ensured that only when a counter moment on the tap drill exceeds the pre-set release moment of the ball-pocket coupling, the coupling balls of the first group are positively pushed out from their ball pockets by the respective smoothly extended walls of the cage slots against the spring force of the axially spring-loaded thrust ring. The coupling balls of the first group thus roll in the cage slots of the first group over the respective path defined by the inclination of the cage slot outwardly unless these coupling balls of the first group strike against the elastic element, which, in this region,is pressed exactly radially outwardly by these coupling balls under the increased spring prestressing of those balls. The such operating ball-pocket coupling then disengages, via the drive sleeve, the drive shaft with the drill, previously engaged with and driven by the ball-pocket coupling, from the sleeve. The previously driven drive sleeve can then freely rotate with the stationary drive shaft with the tap drill. The tap drill and the hole thereby are protected against damage and distruction, and the flanks of the drill are protected against breaks. The coupling balls of the second group in the uncoupled position are effective to support the thrust ring, which is under axial spring pressure, when the coupling balls of the first group arrive at their ball pockets to effect a possible sudden coupling in the ball pockets. If the coupling balls of the second group are not available in the cage slots of the second group the renew coupling with a final renew uncoupling take place. This results in alternating and suddenly acting torque loads on the tap drill and the work-piece and also on the tool machine during operation. Since in response of the coupling and during the alternative disengagement of either of two groups of the coupling balls one of the groups is in a radially and axially prestressed position and the other group at this time is unloaded and free, the impact loads are avoided. In order to screw the tap drill out from the threaded hole in the direction, counter to the working drive direction, the coupling balls of the second group automatically enter in this direction the ball pockets whereby the compression springs of the thrust ring become unloaded. In this return rotation a posititive engagement of the balls by the walls of the cage slots of the second group takes place due to inclination of these walls, and a possible travelling of the coupling balls of the second group away from the slots is prevented. The coupling balls of the second group are rather always held by the inclination of these walls in the coupled position.

The overload coupling device of the present invention has the same advantages as the aforementioned known device but also additionally provides a reduction of wear and reduced costs of manufacturing. The additional three coupling balls of the second group and the additional elastic element add no substantial costs or weight to the known device. Inasmuch as the cage slots and their walls of the first group serve for uncoupling and the cage slots and their walls of the second group serve for a renew coupling in the return rotation direction the inclinations of the individual walls acting on the balls of the first and the second groups are independent from each other and are defined in accordance with the uncoupling and the coupling in the counter rotation direction, respectively.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
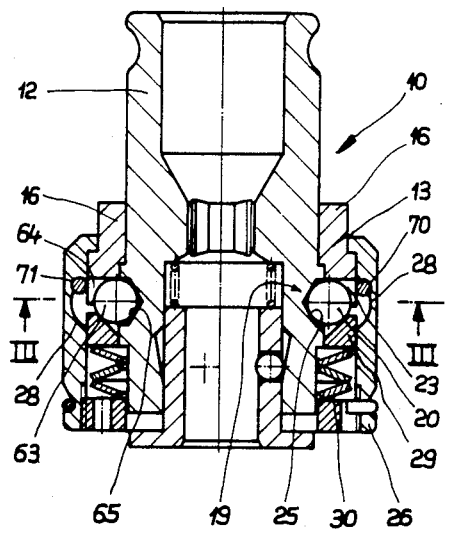
FIG. 1 is an axial longitudinal section of the thread-cutter insert (without a chuck) in the coupled condition.

Referring now to the drawings more specifically, reference numeral 10 designates a quick-change insert 10 which basically corresponds in its construction and the mode of operation to the insert known from German Pat. No. PS25 11 148 corresponding to U.S. Pat. No. 4,041,729, the entire disclosure of which is incorporated herein by reference. To avoid redundances the elements of this invention, which are novel, will be explained herein in comparison to those of the aforementioned patent.

The quick-change insert 10 for a non-illustrated tap drill includes a cylindrical drive shank 12 and a cylindrical drive sleeve 13 coaxial with drive shank 12 and rotatable relative thereto. Drive sleeve 13 carries two mutually diametrically opposite axially projecting drive dogs 16. If the quick-change insert 10 is inserted into a respective non-shown quick-change chuck for thread cutting drive dogs 16 come into torque-transmitting engagement with the chuck. The direction of this working drive is denoted by arrow 18. This arrow extends in the condition of FIG. 1, as seen from above in the axial direction of the quick-change insert 10, in the clockwise direction, and in FIGS. 3, 5-7 in the counterclockwise direction.

A torque coupling with adjustable tripping torque, formed as ball-pocket coupling 19, is positioned between the drive sleeve 13 and drive shank 12. This ball-pocket coupling is spring-loaded. The coupling 19 has a first group of coupling balls 20, which are angularly spaced from each other in the peripheral direction at equal intervals, and a second group of the three coupling balls 63 likewise spaced in the peripheral direction at equal intervals from each other. As can be seen from FIG. 5 coupling balls 63 of the second group in the coupled condition of the insert are spaced substantially at the equal intervals from the coupling balls 20 of the first group.

Figure 2:
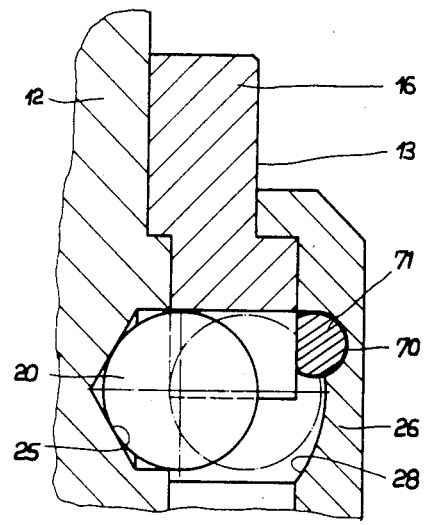
FIG. 2 is a detail of FIG. 1 on the enlarged scale.

On the axial end face, which is opposite to the drive dogs 16 the drive sleeve 13 has a first group of cage slots 23 in which coupling balls 20 of the first group are received. The cage slots 23 of the first group are spaced from each other in the peripheral direction at equal intervals. A second group of cage slots 64 for receiving therein respective coupling balls 63 of the second group are formed in the drive sleeve 13 so that they follow closely adjacent the cage slots 23 of the first group. Cage slots 64 are also spaced from each other at even intervals in the circumferential direction of the drive sleeve. The cage slots 23 and 64 are respectively open in the axial and radial direction. As can be seen from FIG. 2 they are open in the radial direction inwardly and outwardly of sleeve 13. The axial depth of the cage slots 23 and 64 is smaller than the diameter of each associated company ball 20 or 63 so that these balls can extend in axial direction downwardly beyond the lower end face of drive sleeve 13 in the condition of FIG. 1.

Figure 3:
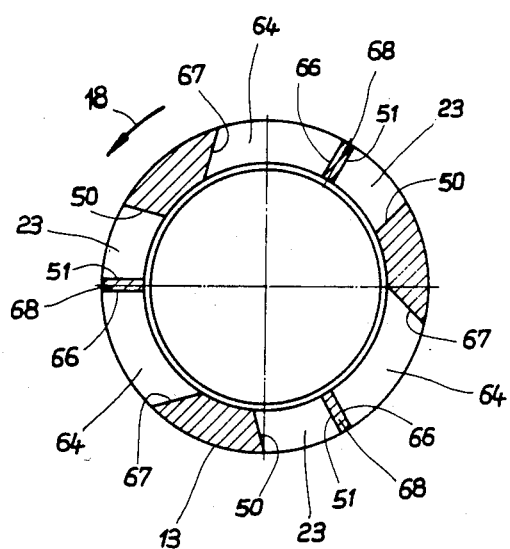
FIG. 3 is a sectional view of the drive sleeve only, taken along line 111—111 of FIG. 1.
Figure 4:
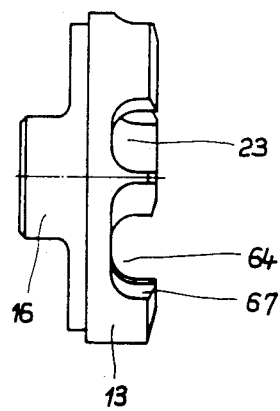
FIG. 4 is a side view of the drive sleeve shown in FIG. 3.

The radial width of the cage slots 23 of the first group is, as shown in FIG. 3, at least as great as the diameter of each coupling ball 20.

The cage slots 64 of the second group have a width which is substantially greater that the diameter of each coupling ball 63 received in these cage slots. The width of cage slots 64 can be up to a double diameter of the coupling ball 63. The diameter of each coupling ball 20 and respectively that of each coupling ball 63 is so great that only one type of the balls is suitable for insertion.

Figure 5:
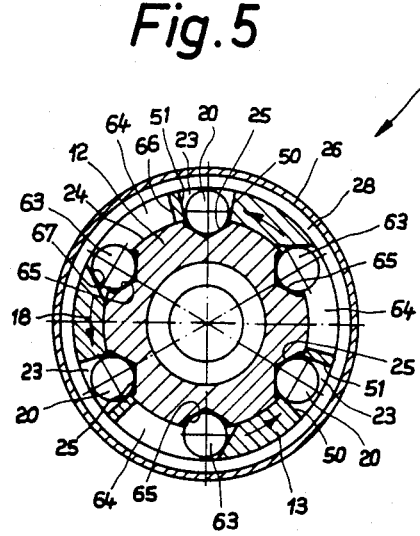
FIG. 5 is a sectional view of the insert taken along line 111—111 of FIG. 1 in the coupled condition of the insert.

The drive shank 12 has in the axial region of cage slots 23 and 64 on its peripheral surface 24 (FIGS. 5-8), facing the drive sleeve 13, six ball pockets 25 and 65 arranged at equal angular distances from each other in the circumferential direction for the coupling balls 20 of the first group and the coupling balls 63 of the second group. Ball pockets 25 and 65 are cup-shaped spherical hollows or recesses and have the width which is smaller than the radius of each coupling ball. The ball pockets 25 serve to receive coupling balls 20 while ball pockets 65 serve to receive coupling balls 63 when the insert is in the coupled condition as seen in FIG. 5.

All cage slots 23 and 64 are inclined in drive sleeve 13 in the direction opposite to the working drive direction indicated by arrow 18. Further specific characteristics of the slots will be explained hereinafter.

A cylindrical closure sleeve 26 is axially non-displaceably supported on the drive sleeve 13. Closure sleeve 26 surrounds the drive sleeve 13 coaxially thereto and to the drive shank 12. The closure sleeve 26 has in its interior in the axial region of all cage slots 23, 64 an annular groove 28, the bottom of which extends in the radial direction from the peripheral surface 24 by a distance equal at least to the diameter of each coupling ball 20, 63.

A thrust ring 29, which is adjustable and pressable axially in the direction towards the cage slots 23 and 64 and against the coupling balls 20 and 63, is arranged in a ring-shaped space between the drive shank 12 and closure sleeve 26. The thrust ring 29 is adjustably supported by means of compression springs 30, provided on the closure sleeve 26.

The specific qualities of the cage slots 23 of the first group will be now explained with reference to FIG. 3. Both opposite walls 50, 51 defining the width of each cage slot 23 in the radial direction at least slightly diverge from each other outwardly so that they form with each other a V-shape cross-section. Thereby the rear wall 50, which acts in the working drive direction during the operation of ball-pocket coupling 19 on an associated coupling ball 20, extends in the direction away from the ball pocket 25 somewhat along a secant of the respective diametrical plane. The other wall 51 of each slot extends somewhat along the respective diametrical plane. These three cage slots 23 of the first group transmit together with associated coupling balls 20 a torque or moment in the direction of arrow 18, whereby the rotating driven sleeve 13 displaces with its rear walls 50 the coupling balls 20 which are positioned in the associated ball pockets 25.

The cage slots 64 of the second group are each defined by two opposite walls 66 and 67 defining the width of each slot in the radial direction. Opposite walls 66 and 67 also at least slightly diverge outwardly away from each other in the radial direction to form a V-shape. Thereby the wall 66, which acts in the drive working direction of arrow 18, during the operation of the ball-pocket coupling 19, on the associated coupling ball 63 in the direction away from the ball pocket 65 (FIG. 7) to displace the coupling ball 63, extends somewhat along the respective diametrical plane. The other wall 67 of each cage slot 64 extends somewhat along a secant to a plane parallel to the respective diametrical plane. Since both walls 66, 67 of each cage slot 64 are spaced from each other by a relatively great distance the coupling ball 63 positioned therein can move in the region between two opposite walls 66, 67. The cage slots 64 with the their walls 67 transmit a drive torque in the reverse direction, counter to the working drive direction (FIG. 8), so to obtain an easy pulling out of the thread cutter in this counter direction from the threaded hole produced.

Both walls 51 and 66 extending approximately along the respective diametrical plane of each slot 23 and each slot 64 project substantially along one and the same diametrical plane as shown in FIG. 3. Walls 51 and 66 therefore are separated from each other by a relatively thin material web or cross-piece 68 extended in the direction of such diametrical plane. In this fashion the cage slots 23 and cage slots 64 are arranged in pairs and grouped in each pair closely adjacent to each other.

In the region of annular groove 23 is arranged, either on the drive shank 12 (as not shown) or on the closure sleeve 26 (as is the case in the exemplified embodiment), an annular elastic element 70. This elastic element is formed of a ring of an elastically deformable material of natural rubber or synthetic rubber. This elastic element can be preferably a commercially available O-ring which is radially prestressed between the outer peripheral surface of drive sleeve 13 and the wall of the annular groove 28. The elastic element 70 is positioned at the axial and radial level of cage slots 23, 64 and is at lest partially received in a circular groove 71 which is formed as a part of annular groove 28. The position of elastic element 70 in the circular groove 71 is such that this element in the unloaded position (FIG. 2) projects radially inwardly beyond the base of annular groove 28 into the circular space between the peripheral surface 24 of drive shank 12 and the annular groove 28. The elastic element 70 can exert a radial force hear directed radially inwardly, on the coupling balls 20 of the first group and the coupling balls 63 of the second group. During the operation of the ball-pocket coupling 19 the elastic element 70 exerts in such a manner on the respective coupling balls 20, 63, radially displaced from the respective ball pockets 25, 65 into the annular groove 28, a radial force which prestresses the respective coupling balls 20, 63 between the peripheral surface 24 of the drive shank 12 and the annular groove 28 of the closure sleeve 26. Thereby the respective forced-out coupling balls 20, 63, displaced from the coupled position and their ball pockets 25, 65, are maintained in prestressed position because these forced-out coupling balls 20, 63 press radially outwardly against the elastic element 70 which yields and exerts on this coupling balls 20, 63 a counter-directed force. The forced-out coupling balls, 20, 63 therefore are positioned in the aforementioned circular space. Thereby a surface contact is obtained at two spots. It is achieved in this manner that in operation of the ball-pocket coupling 19 the radially travelling coupling balls 20, 63 are driven during a relative rotation of a further driven drive sleeve 13 relative to a locked, stationary drive shaft 12 and are always held in the same position in the working drive direction 18.

The mode of operation of the the quick-change insert 10, and particularly the ball-pocket coupling 19 operating as a torque transmitting coupling is similar to that described in U.S. Pat. No. 4,041,729.

FIG. 5 illustrates the insert in the coupled position, in which a thread cutting process is carried out. The coupling balls 20 of the first group, operative in this coupled condition for the transmission of torque, are positioned inside their ball pockets 25 and are held in ball pockets 25 by means of the thrust ring 29 via the compression springs 30 with a pre-adjusted spring force. The force flux during the thread-cutting process develops through the drive dogs 16 of drive sleeve 13, cage slots 23, and particularly walls 50, to the coupling balls 20 of the first group positioned in cage slots 23 and from there via the ball pockets 25 to the drive shank 12 and to the tap drill held therein. The coupling balls 63 of the second group at this point do not transmit torque because coupling balls 63 are positioned distant from the wall 66 and in the proximity of the opposite wall 67 of each cage slot 65.

If now the tap drill runs against the bottom of the blind bore or a defective depth setting has occurred or a core bore has not been drilled sufficiently deep the tap drill stops rotating on the workpiece. A brake moment on the tap drill opposes to the drive torque. If the brake moment is greater than a preadjusted tripping moment of the ball-pocket coupling 19 then uncoupling automatically takes place between the drive sleeve 13 and the drive shank 12 with the tap drill. The ball-pocket coupling responds so that, firstly, the coupling balls of the first group are lifted by the contact wall 50 out from the ball-pockets 25 and this will take place against the axial spring loading of the thrust ring 29. A corresponding axial displacement of the thrust ring 29 against the action of thrust springs 30 is superimposed upon this outward movement of the coupling balls 20. If the coupling balls 20 of the first groop are completely forced out of their ball-pockets 25 they will be pressed radially outwardly from peripheral surface 24 under the compression of elastic element 70 against the latter and will be elastically held thereby (FIG. 6).

At this stage the coupling balls 63 of the second group remain as earlier in their ball pockets 65 unless, during the relative rotation between the drive sleeve 13 and the drive shank 12, which is stationary relative to sleeve 13, the walls 66 of the cage slots 64 gradually stop in the radial direction against the coupling balls 63. At this time the coupling balls 20 of the first group remain in their uncoupled condition during that relative rotation, amplified by the axial pressure of springs 30 and thrust ring 29 (FIG. 6). As soon as, upon this relative movement, walls 66 of the cage slots 64 reach the respective coupling balls 63 these coupling balls are lifted out from their ball pockets 65 (FIG. 7). During this stage coupling balls 20 of the first group are prestressed axially and radially as described above. When, during the relative movement between drive sleeve 13 and drive shank 12 such a rotation position is reached, in which the coupling balls 20 are located at the level of ball pockets 65 of the second group, here in accordance with a rotation angle of about 60°, the first coupling balls 20 move radially inwardly into the ball pockets 65. The coupling balls 20 can freely and without disturbance and sudden motions travel into ball pockets 65 because, as mentioned above, during the lifting of the coupling balls 63 out from the ball pockets 65 the coupling balls 63 are held axially by the compression springs 30 on the thrust ring 29 and are locked against the axial advancement. The coupling balls 63 are now prestressed in the radial direction in the circular space 40 by means of the elastic element 70 such that an inner and an outer bearing of these balls take place.

Figure 6:
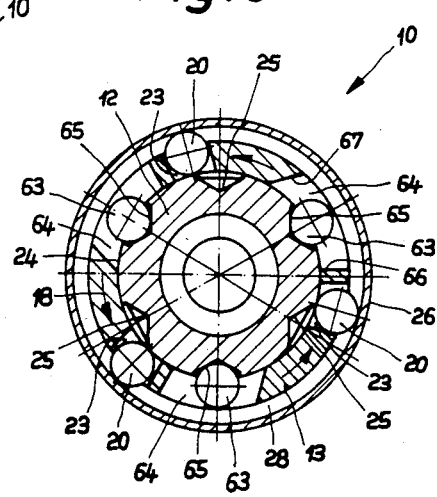
FIGS. 6 through 8 illustrate, respectively, sectional views of the insert taken on line 111—111 of FIG. 2 at various stages in the uncoupled condition.
Figure 7:
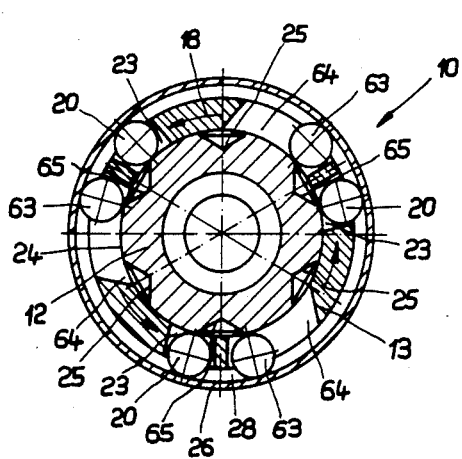

In response to a further angular displacement the coupling balls 63 travel back into ball pockets 25 respectively occuring in the peripheral direction, in which case shortly before that the coupling balls 20 are again pushed out from the coupled position (FIG. 5) by walls 50 to the position according to FIG. 6. This new uncoupling of coupling balls 20 also takes place without sudden loading, and the torque transmission to the tap drill and to the machine proceeds because, before lifting of the coupling balls 20 out from the respective ball pockets, the other coupling balls 63 are found in the disengaged position, and the spring-loaded thrust ring 29 is thereby held axially in this locked position so that it can not be moved axially also under slackening of compression springs 30.

As a result always such group of the coupling balls 20 or 63 operates, which travels aside radially in the annular groove 28, under the compression of the elastic element 70, and axially takes a compression force of the thrust ring 29, whereas another group is free and unloaded. This results in a changing play between the first group of the coupling balls 20 and the second group of the coupling balls 63, whereby the other group of the balls is always freely movable, and an axial and radial relaxing can be obtained at this intermediate stage, which otherwise can cause a repeated sudden coupling with the following sudden uncoupling of the device with the all resulting disadvantages.

The ball-pocket coupling 19 of this type is simple in assembly, inexpensive in manufacture and can be produced with small dimensions. If during the thread-cutting process the tap drill stops it is unloaded. The danger that the drill would break off is avoided or at least substantially reduced. The danger of flank ruptures is minimized. A further advantage of the coupling according to the present invention is that no marks on the coupling balls result due to hammering and impacts on the shaft which was the case during the operation of the alternating torque coupling and uncoupling and returning to the coupled condition. Since no impacts are transmitted high precision can be obtained. This results in a specifically fine thread. Wear of the entire ball-pocket coupling is substantially reduced. A further advantage of this invention is that the tool machine is less loaded because no blows are exerted either on the side of the workpiece or on the machine spindle from the quick-change insert.

Figure 8:
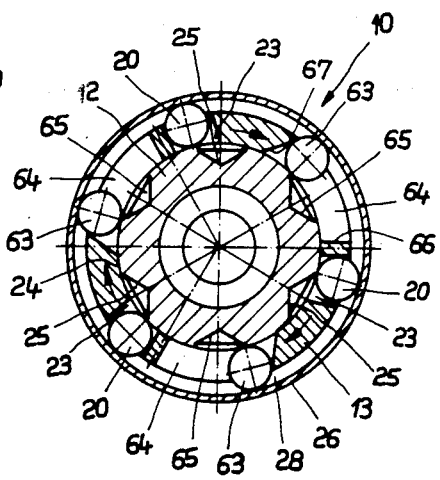

The ball-pocket coupling 19 is set back into the coupled condition when a counter torque directed opposite to arrow 18 is exerted on the drive sleeve 13 (FIG. 8). Thus the coupling balls 63 of the second group become effective for torque transmission. These coupling balls of the second group are now set back again positively in an approximately radial direction into the successive ball pockets 25 or 65 by the strongly obliquely directed wall 67. The return movement results suddenly and rapidly. The inclination of wall 67 of each pocket 65 ensures during the return movement into the ball pockets 25 or 65 that a positive engagement of the drive shank 12 with the drill tap takes place. This is necessary because in the return rotation movement the tap drill must be screwed out from the threaded hole, without destroying this hole. Therefore the torque limitation by the ball-pocket coupling 19 is effective exclusively when the working drive direction corresponds to the direction of rotation according to arrow 18. In oppositely directed return movement the torque coupling 19 does not function. The torque reception is then obtained by the cage slots 64 of the second group, walls 67 and the coupling balls 63.

The coupling balls 20 can, before coupling balls 63 are pressed into their ball pockets, one more time be inserted into the associated ball pockets. Therefore wall 51 of each cage slot 23 must have such an obliquity that no substantial torque would occur in the return rotational movement and the tap drill would be screwed out from the hole before walls 67 would load the coupling balls 63 in the direction of the return rotation.

It will be understood that each of the elements described above, or two or more together, may also find a useful application in other types of overload coupling devices differing from the types described above.

While the invention has been illustrated and described as embodied in a an overload coupling device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspect os this invention.

What is claimed as new and desired to be protected by Letters Patent is set forth in the appended claims:

1. In an overload coupling device for thread-cutter chucks or quick-change inserts therefor, comprising a cylindrical sleeve loadable with the rotational drive moment, a drive shank drivable by said drive sleeve and held coaxially and rotatably within said sleeve; a spring-loaded ball-pocket coupling with adjustable tripping torque positioned in a force transmission flux between said drive sleeve and said drive shank and including a plurality of coupling balls which couple said drive shank with said drive sleeve, said drive sleeve being formed with a plurality of cage slots which are inwardly and outwardly open in a radial direction and which are open in an axial direction on axial end faces thereof, said cage slots each receiving one of said coupling balls, the angular width of said cage slots being at least as great as the diameter of each coupling ball, said drive shank having a peripheral surface facing said drive sleeve and being formed at said peripheral surface in the axial regions of said cage slots with recessed ball-pockets spaced from each other at equal angular intervals in a circumferential direction, said ball-pockets being of a depth smaller than the diameter of the coupling ball and adapted for receiving said coupling balls; a cylindrical closure sleeve coaxially surrounding said drive sleeve and held on said drive sleeve with a formation therebetween of an annular space; a thrust ring arranged in said annular space on an axial side of said coupling balls, said thrust ring being adjustably supported by thrust springs axially in the direction towards said cage slots and being pressable against said coupling balls, said cage slots being substantially inclined towards a working drive direction of said drive sleeve, said closure sleeve having in the axial region of said cage slots in an interior an annular groove the bottom of which extends at a radial distance corresponding at least to the diameter of the coupling ball from said peripheral surface of the drive shank, the improvement comprising said cage slots being arranged in the circumferential direction of said drive sleeve in pairs and following closely adjacent one after another, one cage slot in a pair having an angular width which is substantially as great as the diameter of the associated coupling ball, and another cage slot in the pair, which follows closely adjacent said one cage slot, having an angular width which is substantially greater than the diameter of the associated coupling ball; and an annular elastic element arranged in the annular space between the closure sleeve and the drive shank, said elastic element, in operation of said ball-pocket coupling exerting on the respective coupling ball radially displaced from the associated ball pocket into said annular groove and positioned between said peripheral surface of said drive shaft and said annular groove of said closure sleeve a prestressed radial force.

2. The coupling device as defined in claim 1, wherein in operation of said ball-pocket coupling one of two coupling balls positioned in each pair of the cage slots is always under radial and axial prestressing.

3. The coupling device as defined in claim 2, wherein in operation of said ball-pocket coupling and upon rotation of said drive sleeve one of the two coupling balls positioned in each pair of the cage slot is under radial and axial prestressing in alternation with another coupling ball in each pair while another coupling ball is unloaded and freely movable.

4. The coupling device as defined in claim 3, wherein said elastic element is enclosed in said closure sleeve and is able to exert an inwardly directed radial force.

5. The coupling device as defined in claim 4, wherein said elastic element is arranged in the region axially and radially adjacent to an axial base of said cage slots.

6. The coupling device as defined in claim 5, wherein said closure sleeve has in the region of said annular groove and at an axial and radial level of said cage slots a circular groove in which said elastic element is received and held such that the elastic element in an unloaded condition of said coupling projects radially inwardly beyond a base of said annular groove.

7. The coupling device as defined in claim 1, wherein said elastic element is radially prestressed between said annular groove and an outer peripheral surface of said drive sleeve.

8. The coupling device as defined in claim 1, wherein said elastic element is a ring of elastic material.

9. The coupling device as defined in claim 8, wherein said elastic element is made of rubber.

10. The coupling device as defined in claim 9, wherein said rubber is synthetic.

11. The coupling device as defined in claim 8, wherein said elastic element is formed by O-ring.

12. The coupling device as defined in claim 7, wherein each cage slot has two opposite walls, the opposite walls of one cage slot in each pair diverging from each other in the radial direction to form at least slightly a V-shape, a rear one of said two walls, as seen in the working drive direction in operation of said coupling, acting on the associated coupling ball in the direction of lifting said ball out from the associated ball pocket and extending approximately along a secant to a diametrical plane of said drive sleeve while another wall of said one cage slot extends approximately along the diametrical plane of said drive sleeve.

13. The coupling device as defined in claim 12, wherein the opposite walls of another cage slot in each pair diverge outwardly from each other in the radial direction to form at least slightly a V-shape, one of the opposite walls of said another cage slot which acts in operation of said coupling on the associated coupling ball in the direction of lifting said ball away from the associated ball pocket, extending along a diametrical plane of said drive sleeve while another wall of said another cage slot extends approximately along a parallel secant to the diametrical plane of said drive sleeve.

14. The coupling device as defined in claim 13, wherein the wall of said one cage slot extending along the diametrical plane and the wall of said another cage slot extending along the diametrical plane extend substantially along one and the same plane and being both formed by a thin material web extending in the direction of said plane.

15. The coupling device as defined in claim 14, wherein three of said one cage slots are provided in said drive sleeve and spaced from each other at equal angular intervals and receive the coupling balls of a first group to transmit a drive movement in the working drive direction, and wherein three of said another cage slots are provided in said drive sleeve which are also spaced from each other at equal angular intervals and receive the coupling balls of a second group, said coupling balls of the second group being movable in the associated another cage slots between two opposite walls thereof in the circumferential direction, said coupling balls of the second group non-participating in the transmission of the drive moment in the working drive direction but rather transmitting a drive moment in the direction opposite to said working drive direction when the another wall of said another cage slot, extending approximately along a parallel secant to the diametrical plane of said drive sleeve, engages the associated coupling ball.

* * * * *